May 19, 1925.
A. OBERSOHN ET AL
1,538,730
DEVICE FOR CONVERTING LIQUIDS INTO UNIFORM DROPS
Filed Aug. 7, 1924
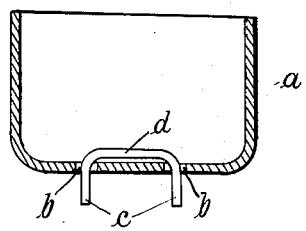
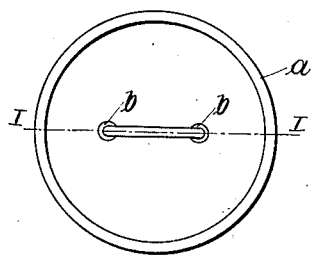
Inventors:
Albert Obersohn
Wilhelm Wachtel
Daniel Sakom
Paul Askenasy
By Sturtevant + Mason
Attorneys.

Patented May 19, 1925.

1,538,730

UNITED STATES PATENT OFFICE.

ALBERT OBERSOHN, OF BERLIN-CHARLOTTENBURG, WILHELM WACHTEL, OF BERLIN, DANIEL SAKOM, OF WIESBADEN, AND PAUL ASKENASY, OF KARLSRUHE, GERMANY.

DEVICE FOR CONVERTING LIQUIDS INTO UNIFORM DROPS.

Application filed August 7, 1924. Serial No. 730,783.

*To all whom it may concern:*

Be it known that I, ALBERT OBERSOHN, a citizen of Hungary, residing at 53 Pestalozzistrasse, Berlin-Charlottenburg, Germany, and I, WILHELM WACHTEL, a citizen of Austria, residing at 61 Bambergerstrasse, Berlin, Germany, and I, DANIEL SAKOM, a citizen of Lithuania, residing at 13 Adolfsallee, Wiesbaden, Germany, and I, PAUL ASKENASY, a citizen of Germany, residing at 44 Kaiserallee, Karlsruhe, Baden, Germany, have jointly invented new and useful Improvements in a Device for Converting Liquids into Uniform Drops, of which the following is a specification.

In various industries it is frequently necessary to form from liquids uniform drops as nearly as possible of a minimum size conditional on the natural surface tension of the liquid in question without forcibly causing said liquid to pass through nozzles or the like.

The means generally employed for the purpose so far has been a perforated sheet or sieve through which the liquid was made to pass to form drops.

This procedure has, however, a number of drawbacks.

A reduction of the diameter of the drops by reducing the diameter of the apertures in the sieve is possible only up to a certain lower limit, which is dependent on the physical properties of the liquid such as viscosity, internal friction and surface tension. This limit is recognizable by the drops falling freely through the sieve aperture without noticeably adhering to the underside of the sieve.

If, however, the diameter of the requisite aperture in the sieve is reduced below this lower limit, the liquid passing through the aperture in the sieve does not however, at once drop off, but adheres first of all to the underside of the sieve and the drop gradually becomes larger; only when a certain quantity of liquid has become collected at this point is a drop actually formed, which then falls away.

In both cases the drops are larger than they should be according to the internal properties of the liquid, and more particularly according to its surface tension.

In order to form smaller drops the liquid may be caused to drop from pins, nipples or the like, the dripping faces of which are shaped either as a point or edge and may be dimensioned in accordance with the internal properties of the liquid so that their co-operation with the adhesion does in reality result in the formation of the smallest possible drops which are obtainable without forcible pulverization.

In this operation, however, there is difficulty in feeding the liquids to the undersides of the pins.

It is difficult and therefore costly to perforate the pins, which are very fine.

An effort to feed the liquid along the surface from which the pins project does not prevent the possibility of the formation at certain points of the surface of drops of larger size which drip off, while no liquid reaches other points of the surfaces and the pins or nipples provided thereon.

The present invention offers a simple solution of the problem in question. Inserted in each of the passages or apertures is a pin having a blunt dripping point and a shank of a diameter smaller than the clear diameter of the aperture, so that narrow passages are formed between the shank and the wall or edge of the aperture.

The upper part or head of the pin is so shaped as to enable the liquid to pass below it on to the perforated bottom through the passages between the perforation and the shank of the pin.

The liquid then flows down along the shank of the pin and there is formed on its lower blunt dripping point, a drop of the predetermined size which ultimately separates and drips off. The width of the aperture as well as the cross section of the passage between the edge of the aperture and the shank of pin must be in accordance with the physical properties, such as the internal friction, viscosity and surface tension of the liquid. The length of the pin must also be selected according to these properties and must take into account particularly the liability of any liquid to become solid in passing down slowly along the shank before the drops are actually formed.

The novel device may be used generally in all cases where larger volumes of liquid are to be converted into drops. This may be the case particularly—

(a) When it is intended to cause liquids to be solidified in the form of drops, or (b) When liquids are to be sent in drop form through a certain space in uniform quantities.

Among the practical possibilities the following may be mentioned:

*Example I.*—A solution of glue of about 40% and at a temperature of 70° C. is caused to flow from a glue container into a vessel which according to the above description is provided with a perforated bottom fitted with the pins above referred to. Drops are thus formed which in falling and while being simultaneously cooled are converted into solid balls or pearls.

*Example II.*—A 20% solution of gelatine at 60° C. may be treated in the same way as the above solution of glue.

*Example III.*—Hot starch glue, molten naphthalene or stearine and the like may likewise be used in the formation of uniform balls or drops by treatment in an apparatus of the above kind.

*Example IV.*—In rotary filters, it may be necessary to bring the water on to the filtering layer in uniform distribution, and more uniform quantity, and this can be readily done by a device according to this invention.

The annexed drawings illustrate by way of example, the most primitive constructional form of a novel device, Fig. 1 showing a section thereof on the line I—I of Fig. 2, and Fig. 2 is a plan view from above.

A vessel $a$ of any appropriate kind is used to contain the liquid which is to be discharged therefrom in the shape of uniform drops. To this end the bottom of the vessel is provided with apertures $b$ of any desired number, two being shown in the drawing. Inserted through these apertures are pins $c$ so as to leave a clearance between the edge of each hole and the shank of the corresponding pin and thereby to form passages of predetermined cross-section through which the liquid may run off by passing down the pins.

At the lower end of each pin a drop of predetermined size is thus caused to be formed, and to drip therefrom after completion.

In the example illustrated, the distance between the edge of the aperture and the shank of the pin is maintained in a simple manner by each two pins being connected by a bridge piece $d$. For this purpose, in order to maintain the correct distance between each of the apertures and the pin shank, a piece of wire is merely shaped to form the members $c\ d\ c$ properly dimensioned for the insertion in the two adjacent holes.

It is obvious that the invention is not to be limited to this particular construction, but any kind of pins or equivalents may be used and other means employed to maintain the pins centred in their apertures, care being taken in all cases that the heads of the pins should not block the access of the liquid to the passages.

What we claim and desire to protect by Letters Patent is:

1. A device for converting liquids into uniform drops consisting of a container for the liquid having an opening in its bottom, and a pin passing through said opening of a predetermined diameter to permit the passage of the liquid therethrough at a predetermined rate, the lower end of said pin being cut off at substantially a right angle to present a drop-forming surface of predetermined area.

2. A device for converting liquids into uniform drops, consisting of a container for the liquid having an opening in its bottom, and a cylindrical pin passing through said opening of a predetermined diameter to permit the passage of the liquid therethrough at a predetermined rate, the lower end of said pin being cut to form a flat horizontal drop-forming surface.

3. A device for converting liquids into uniform drops consisting of a container for the liquid having a pair of openings in its bottom, and a U-shaped member with its legs projecting downwardly through said openings and of a diameter to leave a predetermined annular space.

In testimony whereof we have signed our names to this specification.

ALBERT OBERSOHN.
DIPL. ING. WILHELM WACHTEL.
DANIEL SAKOM.
DR. PAUL ASKENASY.